(12) United States Patent
Felix-Henry

(10) Patent No.: US 8,256,469 B2
(45) Date of Patent: Sep. 4, 2012

(54) METHOD FOR REMOVAL OF PERMEATE GASES FROM A FLEXIBLE TUBULAR PIPE AND PIPE EMBODIED FOR CARRYING OUT THE SAME

(75) Inventor: Antoine Felix-Henry, Rouen (FR)

(73) Assignee: Technip France (FR)

( * ) Notice: Subject to any disclaimer, the term of this patent is extended or adjusted under 35 U.S.C. 154(b) by 1407 days.

(21) Appl. No.: 10/568,023

(22) PCT Filed: Aug. 6, 2004

(86) PCT No.: PCT/FR2004/002101
§ 371 (c)(1),
(2), (4) Date: Mar. 24, 2006

(87) PCT Pub. No.: WO2005/019715
PCT Pub. Date: Mar. 3, 2005

(65) Prior Publication Data
US 2008/0149209 A1    Jun. 26, 2008

(30) Foreign Application Priority Data
Aug. 14, 2003    (FR) ..................................... 03 09954

(51) Int. Cl.
*F16L 11/00*    (2006.01)
(52) U.S. Cl. ......... 138/114; 138/104; 138/130; 138/148
(58) Field of Classification Search .................. 138/104, 138/114, 130, 148
See application file for complete search history.

(56) References Cited

U.S. PATENT DOCUMENTS

| | | | | |
|---|---|---|---|---|
| 3,420,276 A | * | 1/1969 | Skinner et al. | 138/127 |
| 3,547,161 A | * | 12/1970 | Reece et al. | 138/114 |
| 3,735,475 A | * | 5/1973 | Marriott | 29/455.1 |
| 4,036,617 A | * | 7/1977 | Leonard et al. | 62/50.7 |
| 4,315,408 A | * | 2/1982 | Karl | 62/50.7 |
| 4,567,916 A | * | 2/1986 | Antal et al. | 138/104 |
| H594 H | * | 3/1989 | Adorjan | 138/148 |
| 6,032,699 A | * | 3/2000 | Cochran et al. | 138/104 |
| 6,039,083 A | * | 3/2000 | Loper | 138/135 |
| 6,116,290 A | * | 9/2000 | Ohrn et al. | 138/149 |

(Continued)

FOREIGN PATENT DOCUMENTS
EP            0 341 144 B1    11/1989
(Continued)

OTHER PUBLICATIONS

International Search Report PCT/FR2004/002101 dated Jan. 21, 2005.

*Primary Examiner* — James Hook
(74) *Attorney, Agent, or Firm* — Ostrolenk Faber LLP

(57) ABSTRACT

A method for the drainage of permeate gases from a flexible tubular pipe and a pipe embodied for carrying out the method. The pipe comprises at least one inner pressure sleeve, for the transport of hydrocarbons, which contain permeate gases which diffuse across the wall of the inner pressure sleeve. The pipe has an outer sleeve and several reinforcement layers, arranged in an annular zone between the outer sleeve and the inner pressure sleeve. The annular zone has transport ducts in which the permeate gases can circulate towards the removal. The method comprises a forced circulation of the permeate gases in the annular zone through the transport ducts towards the removal.

10 Claims, 2 Drawing Sheets

U.S. PATENT DOCUMENTS

| | | | | |
|---|---|---|---|---|
| 6,446,672 B1 * | 9/2002 | Kalman et al. | ................ | 138/127 |
| 6,634,387 B1 * | 10/2003 | Glejbøl | ........................ | 138/104 |
| 6,634,388 B1 * | 10/2003 | Taylor et al. | .................. | 138/114 |
| 6,769,454 B2 * | 8/2004 | Fraser et al. | .................. | 138/127 |
| 2003/0079481 A1 * | 5/2003 | Cooper | ........................ | 62/50.7 |
| 2005/0155663 A1 * | 7/2005 | Dhellemmes et al. | ........ | 138/149 |

FOREIGN PATENT DOCUMENTS

WO    WO 00/17479    3/2000

* cited by examiner

METHOD FOR REMOVAL OF PERMEATE GASES FROM A FLEXIBLE TUBULAR PIPE AND PIPE EMBODIED FOR CARRYING OUT THE SAME

CROSS REFERENCE TO RELATED APPLICATION

The present application is a 35 U.S.C. §§371 national phase conversion of PCT/FR2004/002101, filed Aug. 6, 2004, which claims priority of French Application No. 0309954, filed Aug. 14, 2003. The PCT International Application was published in the French language.

BACKGROUND OF THE INVENTION

The present invention relates to a method of draining and venting the permeate gases that diffuse into the annulus of a flexible tubular pipe and to a pipe suitable for implementing such a method.

The flexible tubular pipes involved here are unbonded pipes such as those described in the API (American Petroleum Institute) standard 17J to which the reader may refer.

These flexible tubular pipes used in the field of offshore oil production are intended for transporting fluids, especially hydrocarbons. They comprise at least one flexible internal tube made of a polymer material, more commonly called an internal pressure sheath, within which said hydrocarbons flow. The pipes include an external sheath and reinforcing plies or armors, located in the annular region, between the external sheath and the internal pressure sheath.

The pipes, depending on their application and especially on their service conditions and the fluid transported, may include a carcass placed inside the pressure sheath.

In addition, they are likely to include what is called an intermediate sheath located in the annular region.

Although the internal pressure sheath is impermeable to the hydrocarbons, certain gases and molecules contained in these hydrocarbons are liable to diffuse through the wall of said pressure sheath depending on the material of which it is made, on the concentration of said gases and molecules in the hydrocarbons and on the local conditions, especially the pressure and temperature conditions. These gases, which diffuse through the wall of the internal pressure sheath and will be called permeate gases, comprise in particular water in the vapor phase, carbon dioxide, methane or hydrogen sulfide.

Said annular region, comprising the armor(s) or reinforcing plies, includes flow paths that extend, for example, around the armor elements and along said internal pressure sheath over the entire length of the pipe, said permeate gases being capable of flowing naturally along said flow paths, to be drained away toward a venting device. Most often the venting device is located in the connection end-fittings and is formed from one or more differential valves. The flow paths are for example formed by the gaps that exist between the armor wires of the reinforcing plies, or armor plies, or else, thanks to the lateral faces of the ply wires that are longitudinally profiled or grooved and that, even in content, are suitable for forming said flow paths.

Two problems then arise. Not only are the permeate gases liable to corrode the elements of the reinforcement, which are generally made of steel, but water in the vapor phase is also likely to condense under certain temperature and pressure conditions, forming a liquid mixture which obstructs the flow paths and may block the natural flow of the permeate gases. As a result, the pressure of the permeate gases increases in the annular region and these gases, in particular carbon dioxide and hydrogen sulfide, stagnate between the elements of the reinforcement, thereby further exacerbating the corrosion.

Furthermore, the build-up of permeate gas and condensate in the annular region is also likely to cause the outer coating that protects the reinforcement and the internal pressure sheath to burst when the pressure in the annular region is above the pressure existing on the outside of the pipe. This risk is lower at great depth since the hydrostatic pressure compensates for the pressure in the annular region. In contrast, this risk is greatest near the surface, when the permeate gases are no longer being vented.

This condensation problem may in particular be critical in what are called S or wave (lazy-S, steep-S) riser configurations. This is because the condensation in the top part of the pipe will concentrate at the low point of inflection of the pipe (the sag bend) preventing the natural drainage in the bottom part of the pipe from taking place along the pipe toward the surface end-fitting.

To prevent the permeate gases from building up in said annular region, it has been envisioned to drill holes in the outer coating and to close off these holes by valves that open and close rapidly, theses valves being designed to open and close at defined differential .pressures between the annular region and the outside. Thus, when the pressure of the permeate gas in the annular region is above said defined differential pressure, the valves open in order to release the permeate gas to the outside, and close rapidly so that nothing penetrates into the annular region. This is because it is vital for no fluid to penetrate into the annular region, in particular seawater, when the flexible tubular pipe connects a subsea wellhead to a surface platform.

The reader may in particular refer to document EP 0 341 144 which describes such a permeate gas venting device placed in a connection end-fitting of a pipe.

However, on the one hand there still remains a risk that the valves remain in the open position, although the pressure in the annular region is below the external pressure, in which case water can penetrate into the annular region, and, on the other hand, at great depth, the external pressure is such that the valves cannot be easily opened and that the permeate gases then condense in the annular region.

Thus, it has been envisioned to let the permeate gases condense and to reinject the condensate into the internal pressure sheath where the hydrocarbon is flowing. Such a method is described in document WO 00/17479.

However, such a method requires relatively powerful and possibly submersible pumping means.

One problem that arises, which the present invention aims to solve, is therefore to preserve the flexible tubular pipe while not only preventing the permeate gases from being able to condense in the annular region but also preventing the external water from being able to penetrate thereinto.

SUMMARY OF THE INVENTION

For this purpose and according to a first subject, the present invention provides a method of draining and extracting the permeate gases from a flexible tubular pipe for transporting hydrocarbons. Said flexible tubular pipe comprises at least one internal pressure sheath, suitable for conveying said hydrocarbons, permeate gases contained in said hydrocarbons being liable to diffuse through the wall of the internal pressure sheath. The flexible tubular pipe includes a protective coating, or external sheath, and one or more reinforcing plies or reinforcements located in an annular region, between the external sheath and the internal pressure sheath. Said annular region has, along the reinforcing plies, flow paths suitable for draining away the permeate gases toward venting means, and in which paths said permeate gases can flow, said method consisting in forcing said permeate gases in said annular region to flow along said flow paths toward said venting means, which vent the gases to the outside of said annular region.

Advantageously, the venting means consist of differential valves located in the end connection fittings, which means vent the gases by the pressure difference between said annular region and the outside.

Thus, one feature of the invention lies in the method of draining and venting the permeate gases from the annular region which is no longer passive, unlike the pipes according to the prior art, but is active, since the permeate gases are vented toward the outside by forcing the gas in the annular region to flow.

As a result, not only is the partial pressure of the permeate gases, which corrode the elements of the reinforcement, greatly reduced since these permeate gases are expelled from said flow paths and vented to the outside, but, most particularly, water in the vapor phase no longer condenses as it is also entrained with the other permeate gases toward the outside before the partial pressure reaches the saturation vapor pressure and it therefore no longer obstructs the flow paths of the annular region.

As a consequence, the flexible tubular pipe is preserved and moreover the outer coating is no longer liable to burst because the forced active draining of the permeate gases makes it possible to reduce the corrosion of the metal elements and to prevent condensation of said gases, and therefore the potential problems of the external sheath bursting owing to local overpressures due to said condensation.

The permeate gases are preferably forced to diffuse by injecting a pressurized entrainment gas into said flow paths, the entrainment gas being suitable for entraining said permeate gases along said flow paths toward the outside of said annular region. Thus, the drainage or venting takes place by the injection of a gas that is inert with respect to the elements of the reinforcement and with respect to the permeate gases, at a pressure and a flow rate that are suitable for preserving the outer coating and for mechanically entraining said permeate gases along the flow paths toward venting means, known per se, which expel them to the outside of the annular region.

Advantageously, the entrainment gas is injected into a plurality of injection regions spaced longitudinally along said flexible tubular pipe so as to obtain a sufficient flow of entrainment gas at any point on the tubular pipe in order to entrain the permeate gases along the reinforcing plies, toward the venting means.

In the case of a subsea tubular pipe used as a riser, the venting means are preferably just one means located in the end that joins the surface. Other outlets can be provided these being underwater outlets, at the connection end-fittings. These outlets are formed by differential valves mounted on the connection end-fittings.

In a particularly advantageous manner, said entrainment gas is injected at one of the ends of said flexible tubular pipe, preferably at that end connected to a subsea installation located on the seabed, and the permeate gases in the annulus are entrained along the reinforcing plies toward the other end located near the surface and are then vented through said venting means of the end-fittings.

Preferably, the entrainment gas consists of nitrogen, this gas being available at a relatively advantageous cost and completely inert with respect to the permeate gases and to the reinforcement.

According to another, complementary or alternative, way of implementing the invention, the flow is created by sucking said permeate gases out from at least one suction region of said annular region so as to create a forced flow of said permeate gases. Thus, the permeate gases are extracted from the annular region by an underpressure with respect to the outside, which also lowers the partial pressure of the various gases in the annular region compared with the methods of the prior art, and therefore also prevents the permeate gases from condensing in the tubular pipes.

According to a second subject, the present invention provides a flexible tubular pipe for transporting hydrocarbons. Said flexible tubular pipe comprises at least one internal pressure sheath, suitable for conveying said hydrocarbons, permeate gases contained in said hydrocarbons being liable to diffuse through the wall of the internal pressure sheath. The flexible tubular pipe includes a flexible protective coating, or external sheath, and one or more reinforcing plies or reinforcements located in an annular region, between the external sheath and the internal pressure sheath. Said annular region includes, along the reinforcing plies, flow paths suitable for draining away the permeate gases toward venting means, along which paths said permeate gases can flow, said flexible tubular pipe including means for forcing said permeate gases in said annular region to flow along said flow paths toward said venting means.

Advantageously, said means for forcing said permeate gases to flow include at least one supply line emerging in said annular region for supplying pressurized entrainment gas in order to entrain and force the flow of the permeate gases along said flow paths toward venting means opening to the outside.

Thus, the supply line, which is also flexible and mounted adjacent said tubular pipe or inside it, emerges in the annular region so as to inject the pressurized entrainment gas through the flow paths so as to entrain the permeate gases toward the outlet and the outside.

Moreover, the supply line has drilled injection holes spaced apart, and it lies longitudinally in said annular region so as to form a plurality of injection regions spaced longitudinally along said flexible tubular pipe. In this way, thanks to a single supply line that is drilled periodically with a plurality of injection holes and lies over the entire length of the tubular pipe, a plurality of injection regions is formed over the entire length of the pipe. Thus, the annular region of the entire tubular pipe, from one end to the other, is swept with the entrainment gas, which forces the permeate gases to flow and entrains them toward the venting means.

The flexible tubular pipe includes a first end-fitting connected to a subsea installation which is itself connected to at least one wellhead and a second end-fitting located near the surface, and said outlet advantageously emerges to the outside near said second end-fitting, said supply line, which has at least one injection end, extending along said tubular pipe on the inside of the annular space in such a way that said injection end is located substantially near the first end-fitting.

Thus, the injection end, near said first end-fitting, injects the entrainment gas, which can force the permeate gases in the annular region to flow as far as said second end-fitting. In this way, thanks to said injection end, by itself or complementarily with the injection holes drilled along the supply line that alleviate the pressure drops along the tubular pipe, all the permeate gases that diffuse through the internal pressure sheath can be entrained toward the outlet.

Furthermore, the diffusion of the permeate gases toward the outlet is forced thanks to a pressurized-nitrogen supply. Advantageously, the nitrogen is stored under pressure in a storage tank.

According to another way of implementing the invention, the diffusion of said permeate gases is forced by means of a suction pump suitable for sucking said permeate gases into said flow paths in at least one suction region of said annular region.

Other features and advantages of the invention will become apparent on reading the following description of particular embodiments of the invention, given by way of indication but implying no limitation, with reference to the appended drawings.

BRIEF DESCRIPTION OF THE DRAWINGS

FIG. 1 illustrates the structure of a flexible tubular pipe, a portion 10 of which is shown here.

Figure 1:
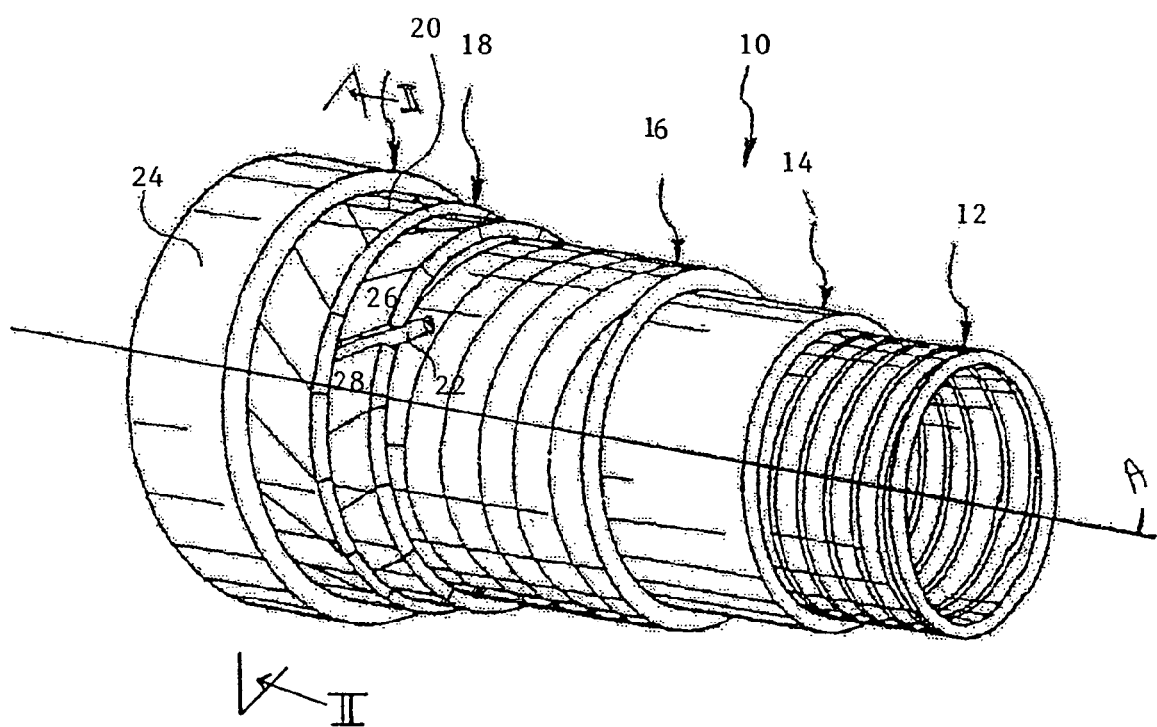
FIG. 1 is a partial schematic view in perspective illustrating a flexible tubular pipe suitable for implementing the method of draining and venting the permeate gases according to the invention.

The pipe illustrated comprises, from the inside outward, a first layer 12 consisting of an interlocked metal winding capable of preventing the pressure sheath (14) that covers it from collapsing under external stresses.

DESCRIPTION OF A PREFERRED EMBODIMENT

A flexible impermeable second layer 14, forming a flexible internal tube called a pressure sheath, made of a polymer-type plastic capable of withstanding the chemical action of the hydrocarbons, covers the first layer 12.

This pressure sheath 14 is covered by a pressure vault 16 forming a third layer, designed to withstand the radial stresses created by the pressure of the fluid flowing in the pipe. The pressure vault 16 consists of a winding, in a short-pitch helix, with a lay angle of about 90° to the pipe axis A around said pressure sheath 14, of one or more interlocked profiled metal wires.

The pressure vault 16 is in turn covered by two armor plies 18, 20 wound one over the other with a long pitch and in the two opposed winding directions so as to be crossed. These two armor plies 18, 20, formed from windings of several wires, generally of approximately rectangular cross section and forming fourth and fifth layers, are wound with a certain gap and allow said pressure vault to take up the longitudinal axial stresses exerted on the pipe and in particular allow it to withstand tensile loads.

Shown in FIG. 1 between the elements forming the armor plies 18, 20 is a portion of line 22, said line 22, inserted between the armor wires of one of the armor plies, being intended for implementing the invention as will be explained below.

The armor plies 18, 20 are also covered with a sixth layer of an external protective coating 24 consisting of a sealing sheath made of a polymer-type plastic.

Thus, the external protective sheath 24 and the internal pressure sheath 14 lying concentrically inside it together define an annular region 23 in which the two armor plies 18, 20 and the pressure vault 16 form the reinforcing plies or reinforcements. The armor plies 18, 20 and the pressure vault 16 are designed to move relative to one another in order to give the pipe flexibility. Furthermore, the wires of the armor plies together define spaces forming flow paths along which a fluid can flow. These spaces (not shown) that appear between the armor ply wires, of rectangular cross section, can be made and widened by providing wires whose sidewalls are profiled, for example wires with concave or convex sidewalls, so as necessarily to define, between two adjacent wires, at least one longitudinal flow path.

Figure 3:
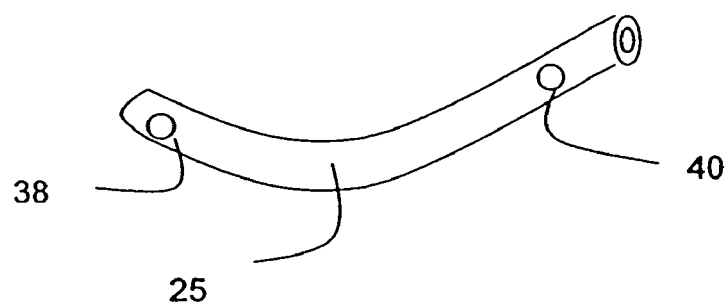
FIG. 3 is a schematic view in perspective of one element of the tubular pipe illustrated in FIGS. 1 and 2.

As shown in FIG. 1, the portion of line 22 constitutes the end of a supply line 25 shown partly in FIG. 3, said supply line being preferably made of stainless steel.

According to a preferred embodiment of the invention, the flexible tubular pipe includes at least one supply line intended for injecting an entrainment gas in order to force the permeate gases in the annular region to flow along the flow paths.

The portion 10 of flexible tubular pipe illustrated in FIG. 1 includes a line that is helically wound between two armor wires 26, 28 of the same armor ply 18.

Figure 2:
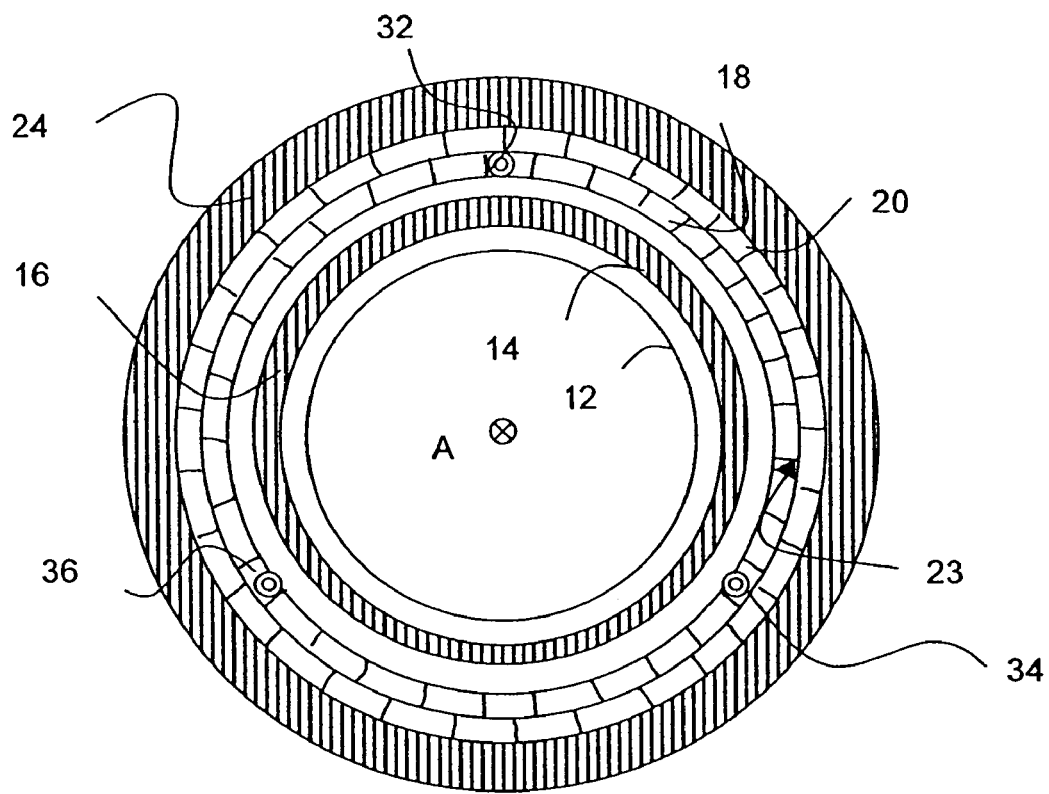
FIG. 2 is a schematic sectional view on II-II of the tubular pipe illustrated in FIG. 1.

Whereas the flexible tubular pipe whose portion 10 is illustrated in FIG. 1 has a single line, the cross section of a tubular pipe as illustrated in FIG. 2, which may be seen in the plane II-II of FIG. 1, has three supply lines shown in cross section 32, 34, 36.

These three supply lines 32 34, 36 are also helically wound between the armor wires of the armor ply 18 that is also illustrated with the other layers.

The supply lines 25, 32, 34, 36 are designed to be under pressure of an entrainment gas, advantageously nitrogen, so as to supply the annular region 23 in order to force gas in said region to flow.

To do this, and as illustrated in FIG. 3, the supply line 25 is drilled locally with injection holes 38, 40 forming nozzles, through which the entrainment gas—nitrogen—is designed to diffuse under pressure.

Thus, the supply lines 25, 32, 34, 36, that extend over the entire length of the flexible tubular pipe, are capable of supplying the annular region 23, locally or over the entire length of said pipe between its two ends, with entrainment gas, which entrainment gas flows along the flow paths toward one or other of said ends.

Thus, thanks to this embodiment, permeate gases diffusing through the pressure sheath 14 into the annular region 23 are entrained by the entrainment gas to one or other of said ends.

In this way, the partial water vapor pressure in the annulus is maintained below the saturation vapor pressure. Thus, not only do these permeate gases, which contain water in the vapor phase, not condense, but they are also entrained out of the annular region 23, thereby reducing the corrosion of the reinforcement, which generally consists of metal windings. Apart from water, the permeate gases also contain hydrogen sulfide and carbon dioxide that contribute to the corrosion of the reinforcing plies.

The number of lines 25, 32, 34 36, their size and the number and position of the injection holes 38 depend on the type of pipe and on the field and service conditions.

It is particularly advantageous to inject the entrainment gases into the bottom part of the flexible tubular pipe through at least two supply lines. According to one particular embodiment of the invention, for a 10-inch riser flexible tubular pipe, i.e. one having a diameter of about 25 cm, which extends over a length of 700 m for joining the seabed at 350 m, the crude being at 130° C. and under a pressure of 240 bar, the rate of injection of entrainment gas must be adjusted so as to provide a flow rate of about 1 liter per hour, for example 0.8 liters per hour, at the venting means in order to prevent the permeate gases from condensing.

Flexible tubular pipes according to the invention are suitable for being installed between a subsea installation, which is connected to wellheads and to which they are connected via a first end-fitting, which installation is located on the seabed or ocean floor, and a surface platform. The supply lines form an integral part of the pipe and are supplied with entrainment gas from the surface using a pressurized nitrogen tank or using a pump. The end of the annular region located at the first end-fitting, which is connected to the wellhead, is perfectly sealed so that the pressurized nitrogen tends to rise toward the surface and emerge at the venting means located close to the upper end near a second end-fitting, on the outside of said annular region, entraining the permeate gases with it.

According to another embodiment of the invention, the entrainment gas is conveyed directly to the first end-fitting located on the subsea installation, using another supply line external to the flexible tubular pipe, for example an umbilical connected to the subsea installation, which will allow the entrainment gas to be injected into the annular region at said installation.

This method of draining and venting the permeate gases according to the invention can be transposed to existing flexible pipes in which the permeate gases flow freely in the annular region, in order to force these gases to drain away toward the outside, and for example through the valves or vent ports placed along the flexible pipe, generally in the connection fittings.

Furthermore, in certain cases, the flexible pipe may include at least one intermediate sheath defining two annuli, namely an external annulus and an internal annulus. In this case, supply lines are installed both in the internal annulus, which will as a priority be drained by forced flow, and in the external annulus.

Moreover, any increase in temperature and pressure results in greater diffusion of the gases through the internal pressure sheath, so that the method according to the invention is perfectly suited for extraction at great depth where the hydrocarbons are at high temperature and under high pressure.

According to another embodiment of the invention (not shown), the gases in the annulus are forced to flow by suction and not by injection. The permeate gases in the annular region are therefore sucked out directly by means of a pump, for example located at the surface on the platform, so as to lower the partial pressure of the various gases contained in the permeate gases and in particular that of water in the vapor phase so as to prevent it from condensing.

The invention claimed is:

1. A method of draining and venting the permeate gases from a subsea flexible tubular pipe for transporting hydrocarbons, wherein the subsea flexible tubular pipe comprises:
at least one internal pressure sheath suitable for transporting the hydrocarbons, whereby permeate gases contained in the hydrocarbons are liable to diffuse through the wall of the internal pressure sheath
an external sheath around the internal sheath; and
at least one reinforcing ply located in an annular region lying between the external sheath and the internal pressure sheath, the annular region having, along the reinforcing plies, flow paths along which the permeate gases can flow toward a vent proximate to the sea surface for venting the permeate gases;
the method comprising:
injecting an entrainment gas under pressure at a subsea location near the seabed into the annular region and along the flow paths to force the permeate gases to flow along the flow paths toward the vent; and
operating the vent for venting the permeate gases out of the annular region and toward the outside of the subsea flexible tubular pipe.

2. The method of draining and venting permeate gases as claimed in claim 1, wherein the entrainment gas is injected into a plurality of injection regions spaced apart longitudinally in the annular region of the subsea flexible tubular pipe.

3. The method of draining and venting permeate gases as claimed in claim 1, wherein the entrainment gas is injected at one of the ends of the subsea flexible tubular pipe.

4. The method of draining and venting permeate gases as claimed in claim 1, wherein a nitrogen-containing gas is injected.

5. The method of draining and venting permeate gases as claimed in claim 1, further comprising creating the flow by sucking the permeate gases out from at least one suction region inside the annular region to force the permeate gases to flow.

6. A subsea flexible tubular pipe for transporting hydrocarbons, comprising:
at least one internal pressure sheath suitable for conveying the hydrocarbons, the sheath being such that permeate gases contained in the hydrocarbons are liable to diffuse through the internal pressure sheath;
an external sheath around the internal sheath and defining an annular region between the sheaths; at least one reinforcing ply located in the annular region lying between the external sheath and the internal pressure sheath, the annular region having, along the reinforcing plies, flow paths along which the permeate gases can flow and
a vent proximate to the sea surface toward which the permeate gases flow;
at least one supply line emerging in the annular region at a subsea location near the seabed for supplying pressurized entrainment gas in order to force the permeate gases in the annular region to flow along the flow paths toward the vent and the vent is suitable for venting the permeate gases out of the annular region and toward the outside of the subsea flexible tubular pipe.

7. The subsea flexible tubular pipe as claimed in claim 6, wherein the supply line lying in the annular region includes drilled injection holes spaced apart so as to form a plurality of injection regions spaced longitudinally along the subsea flexible tubular pipe.

8. The subsea flexible tubular pipe as claimed in claim 6, further comprising a pressurized-nitrogen supply connected to the supply line for forcing the permeate gases to flow.

9. The subsea flexible tubular pipe as claimed in claim 6, further comprising a device operable for forcing the permeate gases to diffuse include a suction pump for sucking the permeate gases into the flow paths in at least one suction region of the annular region.

10. The subsea flexible tubular pipe as claimed in claim 6, wherein the vent comprises differential valves operable for venting the gases by the pressure difference between the annular region and the outside.

* * * * *